United States Patent
Leuthold et al.

(10) Patent No.: US 6,760,142 B2
(45) Date of Patent: Jul. 6, 2004

(54) DELAY INTERFEROMETER OPTICAL PULSE GENERATOR

(75) Inventors: Juerg Leuthold, Eatontown, NJ (US); Xing Wei, New Providence, NJ (US); Liming Zhang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 150 days.

(21) Appl. No.: 10/144,477

(22) Filed: May 13, 2002

(65) Prior Publication Data

US 2003/0210912 A1 Nov. 13, 2003

(51) Int. Cl.[7] .............................. G02F 1/01; G02F 1/15; G02F 1/035; H04B 10/04; H04B 10/12
(52) U.S. Cl. ......................... 359/279; 359/264; 385/3; 398/188; 398/189
(58) Field of Search .................................. 359/264, 279; 372/25; 385/3; 398/188, 189

(56) References Cited

U.S. PATENT DOCUMENTS 5,477,375 A * 12/1995 Korotky et al. ............. 359/264
2003/0007231 A1 * 1/2003 Winzer ........................ 359/245
2003/0210912 A1 * 11/2003 Leuthold et al. ............ 398/188
2004/0005110 A1 * 1/2004 Leuthold et al. .............. 385/15

FOREIGN PATENT DOCUMENTS

GB          2365140 A         2/2002

OTHER PUBLICATIONS

Griffin, R.A.: "Integrated 10 Gb/s Chirped Return–To–Zero Transmitter Using GaAs/AlGaAs Modulators", Marconi Optical Components, Fiber Optics Communications, Photonic Integrated Circuits, 2000 Optical Society of America.

* cited by examiner

Primary Examiner—David N. Spector

(57) ABSTRACT

In accordance with the invention, a train of RZ or CSRZ pulses is produced by passing phase modulated laser light through a delay interferometer. The parameters of the phase modulation and the delay interferometer are calculated from the desired pulse train characteristics (e.g. repetition rate, RZ or CSRZ, duty cycle). A directly modulated CW laser, or a CW laser followed by a phase modulator, produces the constant amplitude, phase modulated light. The phase modulated signal is split into two paths. One signal path is delayed with respect to the other by the calculated delay. The signals are recombined in an optical coupler to produce an RZ pulse train and/or a CSRZ pulse train.

26 Claims, 3 Drawing Sheets

A DELAY INTERFEROMETER PULSE GENERATOR USED IN A TRANSMISSION NETWORK

DELAY INTERFEROMETER OPTICAL PULSE GENERATOR

FIELD OF THE INVENTION

This invention relates to optical pulse sources, and in particular to a return-to-zero or carrier suppressed return-to-zero optical pulse source particularly useful in long haul optical communication systems.

BACKGROUND OF THE INVENTION

Pulses in the return-to-zero (RZ) modulation format are important in long haul and ultra long haul optical fiber communication systems. RZ pulses are optical pulses where the light level reaches or "returns to" zero for some predetermined time interval between pulses. An RZ pulse train is a continuous stream of same shaped pulses.

RZ pulses can be shaped to mitigate the impact of fiber chromatic dispersion, nonlinearity, and polarization mode dispersion as the optical signal travels over long fiber lengths. And, by varying the shape, duty cycle, or optical phase of an RZ pulse train, the power spectrum can be tailored to a specific system channel bandwidth and efficiency requirement. For example, RZ pulses can be formed with alternate IT phase shift, and such RZ pulses are known as carrier suppressed RZ (CSRZ) pulses.

When data is encoded onto an RZ pulse stream, data '1's are represented by pulses. The absence of pulses (intervals of no light of one bit duration) represent data '0's. An important aspect of the RZ modulation format is that where two data '1's come in sequence, the light returns to zero momentarily between successive '1's.

Early optical RZ pulse generators simply switched on and off to generate the optical pulses. This direct modulation scheme proved ineffective because intermittent powering of the laser produced an undesirable variation of the carrier wavelength on a time scale of individual pulses (chirp). Chirp causes the pulse power spectrum to vary from the optimum spectrum of an undistorted RZ shaped pulse. This variation can adversely affect bandwidth and produces signal distortion.

More recent schemes for producing RZ pulses have minimized chirp to tolerable levels. One such scheme was described in U.S. Pat. No. 5,477,375, Optical Soliton Generator to Korotky, et al. The '375 patent describes a CW laser followed by an amplitude modulator and a phase modulator, and finally a pulse compressor to generate an optical pulse train. The same principle was used for optical pulse generation with integrated Mach-Zehnder modulators based on GaAs and enabled integration of the pulse generator and the data modulator (Griffin, et al, *Integrated 10 Gb/s Chirped Return to Zero Transmitter using GaAs/AlGaAs Modulators*, OFC 2001, PD-15).

To date, proposed solutions for the generation of chirp-free RZ or CSRZ pulse trains are still complex and costly. Accordingly, there is a need for a low cost method and apparatus for generating RZ and CSRZ pulses.

SUMMARY OF THE INVENTION

In accordance with the invention, a train of RZ or CSRZ pulses is produced by passing phase modulated laser light through a delay interferometer. The parameters of the phase modulation and the delay interferometer are calculated from the desired pulse train characteristics (e.g. repetition rate, RZ or CSRZ, duty cycle). A directly modulated CW laser, or a CW laser followed by a phase modulator, produces the constant amplitude, phase modulated light. The phase modulated signal is split into two paths. One signal path is delayed with respect to the other by the calculated delay. The signals are recombined in an optical coupler to produce an RZ pulse train and/or a CSRZ pulse train.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale.

DESCRIPTION

This description is divided into two parts: Part I describes advantageous embodiments of the invention, and Part II, written primarily for those skilled in the art, describes the underlying theory.

I. Embodiments of the Invention

Figure 1:
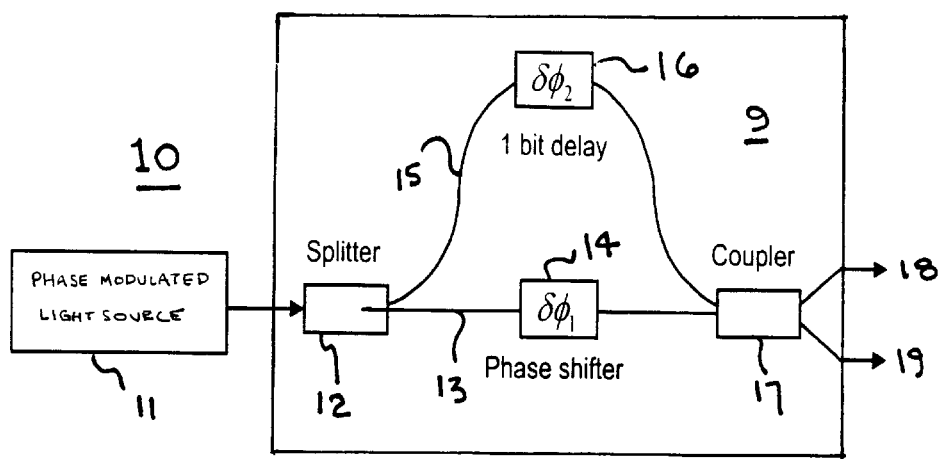
FIG. 1 is a block diagram of the delay interferometer optical pulse generator.

An optical pulse source for generating RZ or CSRZ pulses 10 is shown in FIG. 1 and comprises a phase modulated light source 11 such as a CW laser, and a delay interferometer 9 comprising a splitter 12, a first delay arm 13 with phase shifter 14 and a second delay arm 15 with phase shifter 16 connected to the output of splitter 12, and a coupler 17 that recombines the signals from the two delay arms. The coupler 17 has at least one output, e.g. a first output 18 and second output 19. A CW laser followed by a phase modulator (not shown) can be substituted for the phase modulated CW laser.

The second delay arm 15 has a relative time delay with respect to the first delay arm 13, and in one embodiment of the invention this time delay is set equal to one period of the output pulse train. The two phase shifters 16 and 14 are then chosen, controlled, or fine tuned such that at the output 18 a constructive interference occurs at the center angular frequency of the laser $\omega$. To avoid confusion, the time "delay" of the interferometer is on the order of the pulse period (e.g., 100 ps for a repetition rate of 10 GHz), and the relative "phase" of the interferometer refers to a fine-tuned delay on the order of an optical cycle (e.g., approximately 5 fs at a wavelength of 1.55 $\mu$m).

Figure 2A:
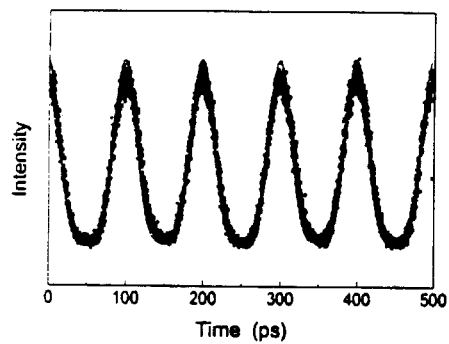
FIG. 2A shows a 33% duty cycle RZ pulse train from one of the coupler outputs.
Figure 2B:
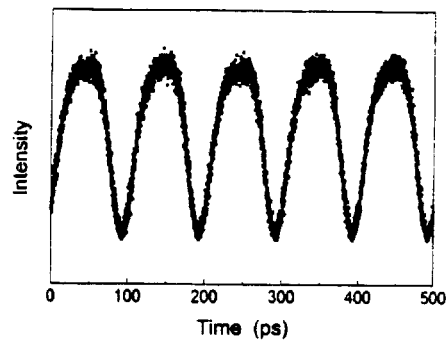
FIG. 2B shows a 67% duty cycle CSRZ pulse train from one of the coupler outputs.
Figure 3A:
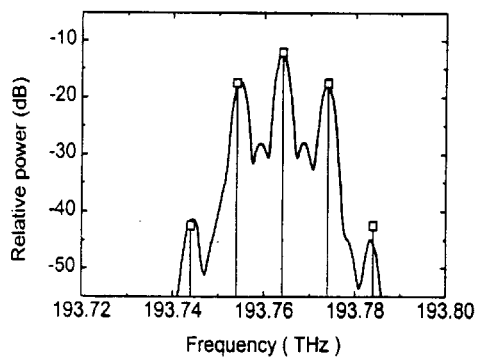
FIG. 3A shows the power spectrum for the waveform of FIG. 2A.
Figure 3B:
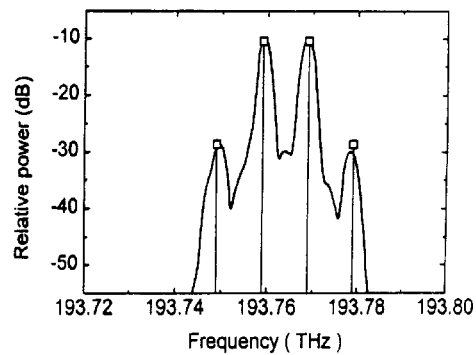
FIG. 3B shows the power spectrum for the waveform of FIG. 2B.

In the above embodiment of the invention, the phase of the laser is sinusoidally modulated at an angular frequency Ω, with a peak to peak phase shift of π. The modulation frequency Ω/2π is equal to half of the repetition rate. With the delay between the two optical arms and the laser phase modulated as described, recombination of the signals from the two delay arms at coupler 15, yields two output pulse streams of complementary power and duty cycle. Typical pulse train outputs are shown in FIGS. 2A and 2B. FIG. 2A shows a 10 GHz repetition rate 33% duty cycle pulse train. FIG. 2B shows the complementary 67% CSRZ pulse train. FIG. 3A shows the power spectrum of the RZ pulse train of FIG. 2A, and FIG. 3B shows the power spectrum of the CSRZ pulse train of FIG. 2B (with power suppressed at the laser center carrier frequency).

Figure 4:
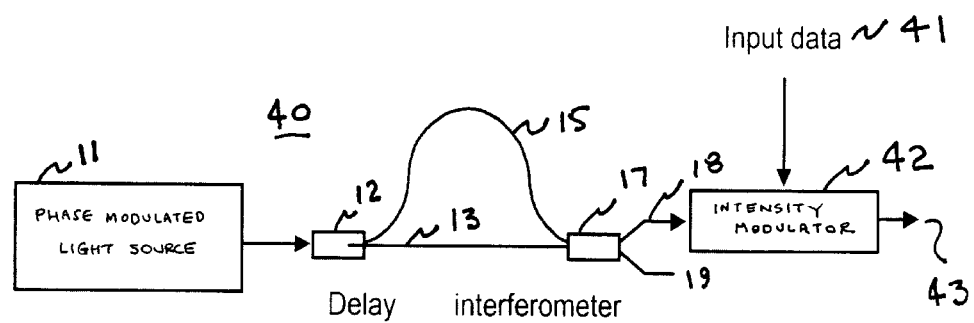
FIG. 4 is a block diagram of an RZ or CSRZ on-off keying (OOK) transmitter comprising a delay interferometer pulse generator.

In a preferred embodiment 40 of the invention, as shown in the block diagram of FIG. 4, an intensity modulator 42 is added to the signal path of the first pulse train output 18 (or the second pulse train output 19) of coupler 17. Input data 41, synchronized to the pulse train by methods well known in the art, control the intensity modulator. They allow pulses to pass for data '1's and blocks pulses for data '0's. The input data can be synchronized such that the intensity modulator only makes transitions at times of zero light in the RZ pulse train, thus advantageously reducing the chirp of the final encoded pulse output 43. Intensity modulator 42 can be an electroabsorption (EA) modulator or a Mach-Zehnder modulator or any other type of intensity modulator of sufficient speed as known in the art.

Figure 5:
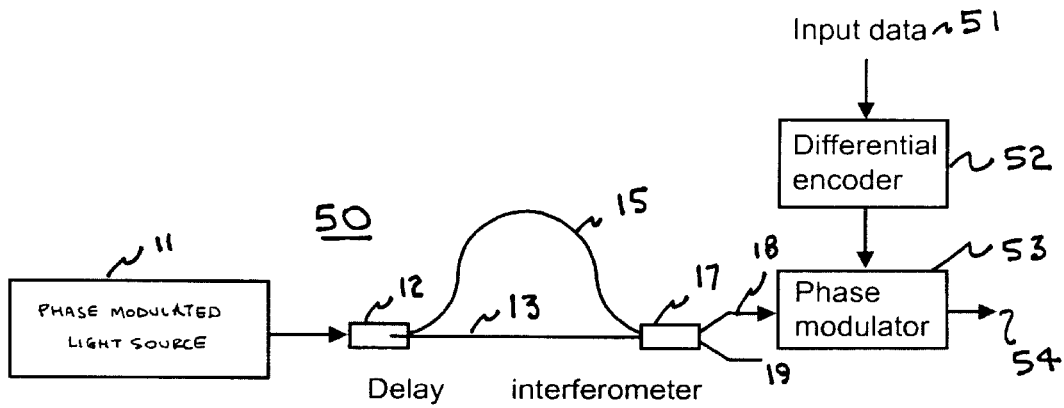
FIG. 5 is a block diagram of an RZ differential phase shift keying (DPSK) transmitter comprising a delay interferometer pulse generator; and, FIG. 6 is a block diagram of an optical transmission system using a delay interferometer pulse generator.

In another embodiment for RZ differential phase shift keying (RZ-DPSK) 50, as shown in FIG. 5, the pulse generator output 18 (or the second pulse train output 19) is coupled to a phase modulator 53. In this scheme, data 51 is first encoded by a differential encoder 52 and then fed to the phase modulator 53. Here, instead of switching the optical pulses on and off as in the intensity modulator of the previous embodiment, phase modulator 53 switches the phase of the output pulses between 0 and π thus forming the DPSK output signal 54.

The delay interferometer can be fabricated by various methods. A well known technology is the silicon optical bench (SiOB) waveguide technology, in which the processing of state of the art follows, in some respects, silicon IC wafer fabrication. Other techniques employ planar waveguides based on III-V compound semiconductor materials such as AlGaAs/GaAs, InGaAsP/InP, etc. Using these semiconductor materials to fabricate the delay interferometer further offers the possibility to advantageously integrate the delay interferometer monolithically with other semiconductor components such as a semiconductor laser or semiconductor modulators (intensity modulators and phase modulators). Integrating the pulse generator with other optical components greatly reduces coupling losses, the physical dimensions of the unit, and its cost. The delay interferometer can also be made with silica fiber.

In a manufactured embodiment, the phase adjustments can be made in either arm or in both arms of the delay interferometer. It is only important that there be a fine-tuned relative delay between the arms. The relative delay can be calculated according to the equations presented in the underlying theory as presented in part II of this disclosure. Tuning of the relative delay can be advantageously done by application of mechanical stress, electric field, or heat, to one or more of the delay arms.

The inventive delay interferometer pulse generator is especially useful as a pulse source for optical transmission systems. Since the delay interferometer uses an inexpensive pair of delay arms, it is very cost effective. And, it requires only one electrical driver signal for the phase modulation of the laser, in contrast to a Mach-Zehnder modulator pulse generator, which usually requires two driver signals configured in the push-pull mode.

Figure 6:
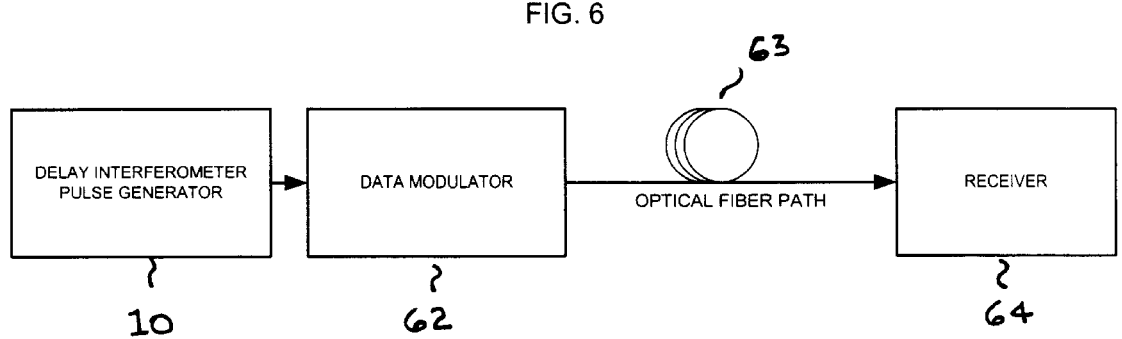

FIG. 6 shows a single channel transmission system where the delay interferometer pulse generator 10 provides a pulse train that is modulated by one of the techniques described above or as otherwise known in the art by modulator 62. The modulated signal is then transmitted across an optical transmission medium 63, which is typically a length of optical transmission fiber and received by receiver 64. The invention is suitable for use in wavelength division multiplexed (WDM) and dense wavelength division multiplexed (DWDM) transmission systems (not shown).

EXAMPLE

A demonstration experiment was carried out with a tunable DBR (distributed Bragg reflector) laser and a delay interferometer with 100 ps optical delay. The wavelength of the DBR laser was tuned to 1547.2 nm. The DBR laser was packaged with a high-frequency connector, through which a 5 GHz sinusoidal current (RF power ~16 dBm) was injected into the grating section to dither the phase. The delay interferometer was fabricated as an integrated optics device with a variable relative phase shift on one arm of the interferometer.

The outputs were measured with a photodiode and a sampling oscilloscope. The two outputs of the delay interferometer were an RZ pulse train of 33% duty cycle (FIG. 2A) and a CSRZ pulse train of 67% duty cycle (FIG. 2B). The optical spectra of the two optical signals were also measured with an optical spectrum analyzer (FIGS. 3A, 3B). The curves are the measured spectra and the discrete vertical lines are the theoretical predictions. The spectral line widths of the measured spectra were limited by instrument resolution.

II. Underlying Theory

Applicant's current understanding of the theory underlying the invention can be illustrated by consideration of an example where the pulse train repetition rate R is R=10 GHz and the pulse period is T=1/R=100 ps
In this example, the phase modulation of the laser is:

$$\phi(t) = \frac{\pi}{2}\sin(\Omega t), \text{ where } \frac{\Omega}{2\pi} = \frac{R}{2} = 5 \text{ GHz}$$

The relative delay between arm 15 and arm 13 is: τ=T=100 ps
The optical fields in the two optical paths 13 and 15 are described as:

$$E_1(t) = \frac{A}{\sqrt{2}}\exp\left(-i\omega t + i\frac{\pi}{2}\sin\Omega t + i\delta\phi_1\right) + c.c.$$

$$E_2(t) = \frac{A}{\sqrt{2}}\exp\left(-i\omega(t-T) + i\frac{\pi}{2}\sin\Omega(t-T) + i\delta\phi_2\right) + c.c.$$

$$= \frac{A}{\sqrt{2}}\exp\left[-i\omega t - i\frac{\pi}{2}\sin\Omega t + i(\omega T + \delta\phi_2)\right] + c.c.$$

where c.c. is the complex conjugate, A is the amplitude of the light signal at the input of the interferometer, ω is the central angular frequency of the laser, δφ$_1$ and δφ$_2$ are adjustable phase shifts of the interferometer (see FIG. 1). The interferometer is fine tuned such that δφ$_1$ differs from $\omega T+\delta\phi_2$ only by an integer number of $2\pi$ within an accuracy of $\pm 0.1$ radians.

Then by neglecting a trivial common phase factor, the equations are simplified to:

$$E_1(t) = \frac{A}{\sqrt{2}} \exp\left(-i\omega t + i\frac{\pi}{2}\sin\Omega t\right) + c.c.$$

$$E_2(t) = \frac{A}{\sqrt{2}} \exp\left[-i\omega t - i\frac{\pi}{2}\sin\Omega t\right] + c.c.$$

The coupler of the interferometer performs an add or subtract operation of the two fields at the output ports 18 and 19 and produces a 33% RZ chirp free pulse train:

$$E_+(t) = \frac{E_1(t) + E_2(t)}{\sqrt{2}} = A\exp(-i\omega t)\cos\left(\frac{\pi}{2}\sin\Omega t\right) + c.c.$$

and a chirp-free 67% CSRZ pulse train:

$$E_-(t) = \frac{E_1(t) - E_2(t)}{\sqrt{2}} = iA\exp(-i\omega t)\sin\left(\frac{\pi}{2}\sin\Omega t\right) + c.c.$$

We note that for the 33% duty cycle pulse train, one can add intentional alternate phase modulation to the pulses by adjusting some of the parameters in the above description. We now consider changing the time delay from T to $\tau$ (for simplicity we assume $\tau \leq T$) and changing the peak to peak phase modulation from $\pi$ to $\Delta\phi_{p-p}$. The phase modulation frequency $\Omega/2\pi$ remains equal to $R/2$. The optical fields of the two optical paths 13 and 15 can be described as:

$$E_1(t) = \frac{A}{\sqrt{2}} \exp\left(-i\omega t + i\frac{\Delta\phi_{p-p}}{2}\sin\Omega t + i\delta\phi_1\right) + c.c.$$

$$E_2(t) = \frac{A}{\sqrt{2}} \exp\left[-i\omega(t-\tau) + i\frac{\Delta\phi_{p-p}}{2}\sin\Omega(t-\tau) + i\delta\phi_2\right] + c.c.$$

For simplicity, we now shift the time reference by $\tau/2$ and substitute t with $t+\tau/2$ in the above equations. We then obtain:

$$E_1(t) = \frac{A}{\sqrt{2}} \exp\left[-i\omega\left(t+\frac{\tau}{2}\right) + i\frac{\Delta\phi_{p-p}}{2}\sin\Omega\left(t+\frac{\tau}{2}\right) + i\delta\phi_1\right] + c.c.$$

$$= \frac{A}{\sqrt{2}} \exp\left[-i\omega t + i\frac{\Delta\phi_{p-p}}{2}\sin\Omega\left(t+\frac{\tau}{2}\right) + i\left(\delta\phi_1 - \frac{\omega\tau}{2}\right)\right] + c.c.$$

$$E_2(t) = \frac{A}{\sqrt{2}} \exp\left[-i\omega\left(t-\frac{\tau}{2}\right) + i\frac{\Delta\phi_{p-p}}{2}\sin\Omega\left(t-\frac{\tau}{2}\right) + i\delta\phi_2\right] + c.c.$$

$$= \frac{A}{\sqrt{2}} \exp\left[-i\omega t + i\frac{\Delta\phi_{p-p}}{2}\sin\Omega\left(t-\frac{\tau}{2}\right) + i\left(\delta\phi_2 + \frac{\omega\tau}{2}\right)\right] + c.c.$$

Similar to the previous case, if the phase shifters 14 and 16 are fine tuned such that $$\delta\phi_1 - \frac{\omega\tau}{2} \text{ and } \delta\phi_2 + \frac{\omega\tau}{2}$$

differ only by an integer number of $2\pi$, we can again neglect this trivial common phase factor and simplify the above equations to:

$$E_1(t) = \frac{A}{\sqrt{2}} \exp\left[-i\omega t + i\frac{\Delta\phi_{p-p}}{2}\sin\Omega\left(t+\frac{\tau}{2}\right)\right] + c.c.$$

$$E_2(t) = \frac{A}{\sqrt{2}} \exp\left[-i\omega t + i\frac{\Delta\phi_{p-p}}{2}\sin\Omega\left(t-\frac{\tau}{2}\right)\right] + c.c.$$

The output at port 18 is then:

$$E_+(t) = \frac{E_1(t) + E_2(t)}{\sqrt{2}}$$

$$= \frac{A}{2} \exp(-i\omega t)\left\{\exp\left[i\frac{\Delta\phi_{p-p}}{2}\sin\Omega\left(t+\frac{\tau}{2}\right)\right] + \exp\left[i\frac{\Delta\phi_{p-p}}{2}\sin\Omega\left(t-\frac{\tau}{2}\right)\right]\right\} + c.c.$$

$$= A\exp\left(-i\omega t + i\frac{\Delta\phi_{p-p}}{2}\cos\frac{\Omega\tau}{2}\sin\Omega t\right)\cos\left(\frac{\Delta\phi_{p-p}}{2}\sin\frac{\Omega\tau}{2}\cos\Omega t\right) + c.c.$$

If we choose the peak to peak phase modulation depth to be $$\Delta\phi_{p-p} = \frac{\pi}{\sin\frac{\Omega\tau}{2}},$$

we find:

$$E_+(t) = A\exp\left(-i\omega t + i\frac{\pi}{2\tan\frac{\Omega\tau}{2}}\sin\Omega t\right)\cos\left(\frac{\pi}{2}\cos\Omega t\right) + c.c$$

Such an output is a 33% duty cycle pulse train with some additional sinusoidal phase modulation. The maximum phase variation occurs at the peak of the pulse, and such additional phase changes sign between two adjacent pulses. The phase difference between two adjacent pulses is $$\frac{\pi}{\tan\frac{\Omega\tau}{2}}.$$

Such a pulse train with alternate phase modulation is referred to as an alternate phase (AP) pulse train.

In a special example of the AP pulse generator, the relative phase between two adjacent pulses is $\pi/2$, and such a pulse train is referred to as a 90 degree AP pulse train. To generate such a 90 degree AP pulse train, we can use $\tau \approx 0.7T$ and $\Delta\phi_{p-p} \approx 1.1\pi$. This has been considered in a co-pending U.S. patent application Ser. No. 10/099,077, High-Bit-Rate Long-Haul Fiber Optic Communication System Techniques and Arrangements, Doug Gill, Xiang Liu, and Xing Wei, filed Mar. 14, 2002, assigned to Lucent Technologies, and incorporated herein by reference.

We also note that the idea of the delay interferometer pulse generator can be further generalized for producing optical pulses with duty cycles other than 33% and 67% by changing some parameters in the configuration. In the following example, the pulse trains at outputs 18 and 19 both have a duty cycle of 50%. Here the peak to peak phase modulation is $$\Delta\phi_{p-p} = \frac{\pi}{2},$$

the modulation frequency is $\Omega/2\pi=R$ (R is the pulse repetition rate), and the time delay is $$\tau = \frac{T}{2}$$

(one half of the pulse period T) in the delay interferometer. In this case the optical fields in the two optical paths 13 and 15 are described as:

$$E_1(t) = \frac{A}{\sqrt{2}}\exp\left[-i\omega t + i\frac{\pi}{4}\sin\Omega t + i\delta\phi_1\right] + c.c.$$

$$E_2(t) = \frac{A}{\sqrt{2}}\exp\left[-i\omega\left(t - \frac{T}{2}\right) + i\frac{\pi}{4}\sin\Omega\left(t - \frac{T}{2}\right) + i\delta\phi_2\right] + c.c.$$

$$= \frac{A}{\sqrt{2}}\exp\left[-i\omega t - i\frac{\pi}{4}\sin\Omega t + i\left(\frac{\omega T}{2} + \delta\phi_2\right)\right] + c.c.$$

Similarly, if the delay interferometer is fine tuned such that $$\delta\phi_1 = \frac{\omega T}{2} + \delta\phi_2 + \left(2N + \frac{1}{2}\right)\pi$$

within an accuracy of ±0.1 radians (N is an integer), by neglecting a trivial common phase factor, the optical fields can be simplified to:

$$E_1(t) = \frac{A}{\sqrt{2}}\exp\left[-i\omega t + i\frac{\pi}{4}(1 + \sin\Omega t)\right] + c.c.$$

$$E_2(t) = \frac{A}{\sqrt{2}}\exp\left[-i\omega t - i\frac{\pi}{4}(1 + \sin\Omega t)\right] + c.c.$$

The signals at the output ports 18 and 19 are chirp-free 50% RZ pulse trains:

$$E_+(t) = \frac{E_1(t) + E_2(t)}{\sqrt{2}} = A\exp(-i\omega t)\cos\left[\frac{\pi}{4}(1 + \sin\Omega t)\right] + c.c.$$

$$E_-(t) = \frac{E_1(t) - E_2(t)}{\sqrt{2}} = iA\exp(-i\omega t)\sin\left[\frac{\pi}{4}(1 + \sin\Omega t)\right] + c.c.$$

Overview

It can now be seen that the inventive pulse generator is an optical pulse source comprising a phase modulated light source with a delay interferometer coupled to the phase modulated light source. The interferometer has an optical splitter with two outputs, a pair of optical delay paths respectively optically coupled to the two outputs to cause a relative delay between them, and a coupler connected to the delay paths to recombine the signals. And, the coupler has at least one coupler output for generating a train of optical pulses with a repetition rate R and a period T=1/R.

The optical pulse source has three basic parameters that can take on discrete values to produce various types of pulse train outputs. First, the phase modulated light source has a phase modulation frequency of R/2 or R. Secondly, the optical pulse source is phase modulated with a peak-to-peak amplitude $\Delta\phi_{p-p}$ of about $\pi$ or about $\pi/2$ with a tolerance of +/−20%. And finally, the relative delay between the delay arms about T or about T/2 with a tolerance of +/−20%. The pulse train can be generated when the relative delay corresponds to a phase shift of about $2N\pi$, about $(2N+1/2)\pi$, or about $(2N+1)\pi$, with a tolerance of +/−0.1 radians, at the center angular frequency $\omega$ of the laser, N being an integer. The relative delay can be tuned by mechanical stress, heat, or by an electric field.

The light source can be a direct modulated laser or a laser followed by an external phase modulator. The laser can be a distributed feedback (DFB) laser, or a distributed Bragg reflector (DBR) laser. Various combinations of the laser, phase modulator, and interferometer can be integrated onto a single substrate. For example, a direct phase modulated laser and a the delay interferometer can be integrated onto one substrate. Similarly, a phase modulator and the interferometer can be integrated on one substrate.

The delay interferometer is particularly useful for generating periodic pulse trains with output duty cycles of 33%, 50%, and 67%.

To generate a 33% output duty cycle, the light source has a phase modulation frequency of R/2 and a peak-to-peak amplitude of the phase modulation of about $\pi$ with a tolerance of +/−20%, the delay interferometer has a relative time delay between the two arms of about T with a tolerance of +/−20% corresponding to a relative phase shift of $2N\pi$+/−0.1 radians.

To generate a 67% output duty cycle, the light source has a phase modulation frequency of R/2 and a peak-to-peak amplitude of the phase modulation of about $\pi$ with a tolerance of +/−20%, the delay interferometer has a relative time delay between the two arms of about T with a tolerance of +/−20% corresponding to a relative phase shift of $(2N+1)\pi$+/−0.1 radians.

To generate a 50% output duty cycle, the light source has a phase modulation frequency of R and a peak-to-peak amplitude of the phase modulation of about $\pi/2$ with a tolerance of +/−20%, the delay interferometer has a relative time delay between the two arms of about T/2 with a tolerance of +/−20% corresponding to a relative phase shift of $(2N+1/2)\pi$ with a tolerance of +/−0.1 radians.

By adding an intensity modulator optically coupled to the coupler output and switching synchronously with the pulse train input data can be encoded onto the pulse train. The delay interferometer and the intensity modulator can both be integrated onto one substrate.

By adding a differential encoder connected to a phase modulator, with the phase modulator optically coupled to the coupler output, a differential phase shift keying (DPSK) encoded pulse train can be generated. Both the delay interferometer and the DPSK modulator can be integrated onto one substrate.

The delay interferometer pulse generator is especially suited for use as a source of optical pulses for an optical transmission system. Additionally, a receiver can be used on the optical path to receive the optical pulses at the pulse source, or anywhere on the optical path downstream from the source.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

We claim:

1. An optical pulse source comprising:
   a phase modulated light source;
   a delay interferometer coupled to the phase modulated light source, the interferometer, comprising an optical splitter having two outputs, a pair of optical delay paths respectively optically coupled to the two outputs to cause a relative delay between them, and a coupler connected to the delay paths to recombine the signals for generating a periodic train of optical pulses with a repetition rate of R(Hz) and a period of T=1/R, the coupler having at least one coupler output.

2. The optical pulse source of claim 1 wherein the phase modulated light source has a phase modulation frequency of R/2 or R.

3. The optical pulse source of claim 1 wherein the phase modulated light source is phase modulated with an amplitude $\Delta\phi_{p-p}$ of about $\pi$ or about $\pi/2$.

4. The optical pulse source of claim 1 wherein the relative delay between the delay arms is about T or about T/2.

5. The optical pulse source of claim 1 wherein the relative delay corresponds to a phase shift of about $2N\pi$, about $(2N+1)\pi$, or about $(2N+1/2)\pi$, at the center angular frequency $\omega$ of the laser, N being an integer.

6. The optical pulse source of claim 1 wherein the relative delay is tunable.

7. The optical pulse source of claim 6 wherein the relative delay is tunable by heat.

8. The optical pulse source of claim 6 wherein the relative delay is tunable by mechanical stress.

9. The optical pulse source of claim 6 wherein the relative delay is tunable by an electric field.

10. The optical pulse source of claim 1 wherein the light source comprises a direct phase modulated laser.

11. The optical pulse source of claim 10 wherein the direct phase modulated laser and the delay interferometer are integrated on one substrate.

12. The optical pulse source of claim 1 wherein the light source comprises a laser connected to an external phase modulator.

13. The optical pulse source of claim 12 wherein the phase modulator and the delay interferometer are integrated on one substrate.

14. The optical pulse source of claim 1 wherein the light source comprises a distributed feed back (DFB) laser.

15. The optical pulse source of claim 1 wherein the light source comprises a distributed Bragg reflector (DBR) laser.

16. The optical pulse source of claim 1 wherein the light source has a phase modulation frequency of R/2 and a peak-to-peak amplitude of the phase modulation of about $\pi$, the delay interferometer has a relative time delay between the two arms of about T corresponding to a relative phase shift of about $2N\pi$, and the output is an RZ pulse train with a duty cycle about 33%.

17. The optical pulse source of claim 1 wherein the light source has a phase modulation frequency of R/2 and a peak-to-peak amplitude of the phase modulation of about $\pi$, the delay interferometer has a relative time delay between the two arms of about T corresponding to a relative phase shift of about $(2N+1)\pi$, and the output is a carrier-suppressed RZ pulse train with a duty cycle about 67%.

18. The optical pulse source of claim 1 wherein the light source has a phase modulation frequency of R and a peak-to-peak amplitude of the phase modulation of about $\pi/2$, the delay interferometer has a relative time delay between the two arms of about T/2 corresponding to a relative phase shift of about $(2N+1/2)\pi$, and the output is an RZ pulse train with a duty cycle about 50%.

19. The optical pulse source of claim 1 further comprising an intensity modulator, the intensity modulator optically coupled to the coupler output and switching synchronously with the pulse train to encode input data onto the pulse train.

20. The optical pulse source of claim 19 wherein the delay interferometer and the intensity modulator are integrated on one substrate.

21. The optical pulse source of claim 19 wherein the intensity modulator is an electroabsorption modulator.

22. The optical pulse source of claim 19 wherein the intensity modulator is a Mach-Zehnder modulator.

23. The optical pulse source of claim 1 further comprising a differential encoder connected to a phase modulator, the phase modulator optically coupled to the coupler output for generating a differential phase shift keying (DPSK) encoded pulse train.

24. The optical pulse source of claim 23 wherein the delay interferometer and the DPSK phase modulator are integrated on one substrate.

25. An optical transmission system comprising an optical pulse source according to claim 1, a data modulator, and an optical path comprising a length of optical fiber optically coupled to the data modulator.

26. An optical transmission system comprising an optical pulse source according to claim 1, a data modulator, and an optical path comprising a length of optical fiber optically coupled to the data modulator, and a receiver optically coupled to the path downstream of the data modulator.

* * * * *